US007987668B2

(12) United States Patent
Kakino et al.

(10) Patent No.: US 7,987,668 B2
(45) Date of Patent: Aug. 2, 2011

(54) ELECTRO HYDROSTATIC ACTUATOR WITH SWASH PLATE PUMP

(75) Inventors: Atsushi Kakino, Aichi-ken (JP); Hiroshi Saito, Aichi-ken (JP); Kenta Kawasaki, Aichi-ken (JP); Takashi Oka, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 769 days.

(21) Appl. No.: 12/068,711

(22) Filed: Feb. 11, 2008

(65) Prior Publication Data

US 2008/0236156 A1 Oct. 2, 2008

(30) Foreign Application Priority Data

Mar. 30, 2007 (JP) ................................ 2007-091407

(51) Int. Cl.
*F16D 31/02* (2006.01)

(52) U.S. Cl. ........................................... 60/452; 60/476

(58) Field of Classification Search .................... 60/443, 60/446, 452, 476
See application file for complete search history.

(56) References Cited

U.S. PATENT DOCUMENTS

| | | | | |
|---|---|---|---|---|
| 4,510,750 | A * | 4/1985 | Izumi et al. | 60/452 |
| 4,756,157 | A * | 7/1988 | Appel | 60/452 |
| 5,907,952 | A * | 6/1999 | Akasaka et al. | 60/452 |
| 6,427,441 | B2 * | 8/2002 | Wustefeld et al. | 60/452 |

FOREIGN PATENT DOCUMENTS

| | | |
|---|---|---|
| JP | 8-326705 | 12/1996 |
| JP | 2001-295802 | 10/2001 |
| JP | 2005-36870 | 2/2005 |
| JP | 2005-240974 | 9/2005 |
| JP | 2006-300187 | 11/2006 |

OTHER PUBLICATIONS

Japanese Office Action issued Apr. 22, 2009 for Japanese Application No. 2007-091407 w/partial translation.

* cited by examiner

*Primary Examiner* — Michael Leslie
(74) *Attorney, Agent, or Firm* — Wenderoth, Lind & Ponack, L.L.P.

(57) ABSTRACT

A fluid pressure actuator includes an output cylinder, a fluid pressure pump, an electric motor, a first output cylinder passage, a second output cylinder passage, a return passage and a swash plate control cylinder. The output cylinder includes a first output cylinder chamber, a second output cylinder chamber and an output piston arranged between the first output cylinder chamber and the second output cylinder chamber. The fluid pressure pump includes a first supply and discharge port, a second supply and discharge port and a swash plate for changing displacement of the fluid pressure pump. The electric motor drives the fluid pressure pump. The first output cylinder passage connects the first output cylinder chamber and the first supply and discharge port. The second output cylinder passage connects the second output cylinder chamber and the second supply and discharge port.

10 Claims, 6 Drawing Sheets

ELECTRO HYDROSTATIC ACTUATOR WITH SWASH PLATE PUMP

BACKGROUND OF THE INVENTION

1. Field of the Invention

The present invention relates to a fluid pressure actuator. This patent application is based on Japanese patent Application No. 2007-091407. The disclosure of the Japanese Patent Application is incorporated herein by reference.

2. Description of Related Art

A conventional fluid pressure actuator includes: a cylinder containing a piston; a fluid pressure pump which feeds and discharges working fluid to and from the cylinder to move the piston forward and backward; and an electric motor which drives the fluid pressure pump. For the fluid pressure actuator, a fluid pressure pump is suitably used displacement of which is changed by adjusting an angle of a swash plate. A method to reduce the power consumption of the electric motor has been known. In the method, the swash plate is controlled to reduce the angle of the swash plate. Conventionally, a power source such as electric power source or fluid pressure source, other than a power source for driving the piston, is used for the swash plate control.

For example, Japanese Laid Open Patent Application (JP-P2001-295802A) discloses a method in which an electric motor, other than a electric motor for driving a fluid pressure pump, adjusts the angle of the swash plate through a reduction gear, and a method in which displacement is reduced based on pressure difference in a fluid pressure actuator.

Japanese Laid Open Patent Application (JP-P 2005-240974A) discloses a method of controlling the rotation speed of an electric motor for driving a fluid pressure pump and the angle of a swash plate through mapping control based on target and present positions of a piston and an output force of the piston.

SUMMARY

An object of the present invention is to provide a fluid pressure actuator that permits downsizing and weight-saving of an aircraft steering system and a control method of fluid pressure actuator.

In a first aspect of the present invention, a fluid pressure actuator includes an output cylinder, a fluid pressure pump, an electric motor, a first output cylinder passage, a second output cylinder passage, a return passage and a swash plate control cylinder. The output cylinder includes a first output cylinder chamber, a second output cylinder chamber and an output piston arranged between the first output cylinder chamber and the second output cylinder chamber. The fluid pressure pump includes a first supply and discharge port, a second supply and discharge port and a swash plate for changing displacement of the fluid pressure pump. The electric motor drives the fluid pressure pump. The first output cylinder passage connects the first output cylinder chamber and the first supply and discharge port. The second output cylinder passage connects the second output cylinder chamber and the second supply and discharge port. The return passage is connected to an accumulator for accumulating working fluid leaked from the fluid pressure pump. The swash plate control cylinder is supplied with working fluid from one passage of the first output cylinder passage and the second output cylinder passage having higher pressure than another passage, drives the swash plate and discharges working fluid to the return passage.

In a second aspect of the present invention, a fluid pressure actuator includes an output cylinder, a fluid pressure pump, an electric motor, a first output cylinder passage, a second output cylinder passage, a return passage, a swash plate control cylinder, a shuttle valve, a servo valve, a piston position sensor, a motor speed sensor, a swash plate angle sensor and an output sensor. The output cylinder including a first output cylinder chamber, a second output cylinder chamber and an output piston arranged between the first output cylinder chamber and the second output cylinder chamber. The fluid pressure pump including a first supply and discharge port, a second supply and discharge port and a swash plate for changing displacement of the fluid pressure pump. The electric motor drives the fluid pressure pump. The first output cylinder passage connects the first output cylinder chamber and the first supply and discharge port. The second output cylinder passage connects the second output cylinder chamber and the second supply and discharge port. The return passage is connected to an accumulator for accumulating working fluid leaked from the fluid pressure pump. The swash plate control cylinder includes a first swash plate control cylinder chamber, a second swash plate control cylinder chamber and a swash plate control piston connected to the swash plate and arranged between the first swash plate control cylinder chamber and the second swash plate control cylinder chamber. The swash plate control cylinder is supplied with working fluid from a swash plate control passage, drives the swash plate and discharges working fluid to the return passage. The shuttle valve supplies working fluid from one passage of the first output cylinder passage and the second output cylinder passage having higher pressure than another passage to the swash plate control passage. The piston position sensor detects a position of the output piston as a piston position detection value. The motor speed sensor detects a rotation speed of the electric motor as a motor speed detection value. The swash plate angle sensor detects a swash plate angle of the swash plate as a swash plate angle detection value. The output sensor detects an output force of the output cylinder as an output force detection value. The fluid pressure actuator further includes: a means for obtaining a piston speed command value which indicates a target speed of the output piston and is based on a difference between the output piston position detection value and an output piston position command value indicating a target position of the output piston; a means for obtaining a motor speed command value indicating a target rotation speed of the electric motor based on the piston speed command value and the output force detection value; a means for obtaining a swash plate angle command value indicating a target swash plate angle of the swash plate based on the piston speed command value and the output force detection value; a means for controlling the rotation speed of the electric motor based on the motor speed detection value and the motor speed command value; and a means for controlling the servo valve to have a first state or a second state based on the swash plate angle detection value and the swash plate command value. When the servo valve has the first state, the servo valve connects the swash plate control passage and the first swash plate control cylinder chamber and connects the return passage and the second swash plate control cylinder chamber. When the servo valve has the second state, the servo valve connects the swash plate control passage and the second swash plate control cylinder chamber and connects the return passage and the first swash plate control cylinder chamber.

In a third aspect of the present invention, a control method of fluid pressure actuator includes: detecting a position of an output piston of an output cylinder as a piston position detection value; detecting a rotation speed of an electric motor as a motor speed detection value; detecting a swash plate angle of a swash plate as a swash plate angle detection value; detecting an output force of the output cylinder as an output force detection value; obtaining a piston speed command value which indicates a target speed of the output piston and is based on a difference between the output piston position detection value and an output piston position command value indicating a target position of the output piston; obtaining a motor speed command value indicating a target rotation speed of the electric motor based on the piston speed command value and the output force detection value; obtaining a swash plate angle command value indicating a target swash plate angle of the swash plate based on the piston speed command value and the output force detection value; controlling the rotation speed of the electric motor based on the motor speed detection value and the motor speed command value; and controlling the servo valve to have a first state or a second state based on the swash plate angle detection value and the swash plate command value. The output cylinder includes a first output cylinder chamber, a second output cylinder chamber and the output piston arranged between the first output cylinder chamber and the second output cylinder chamber. A fluid pressure pump includes a first supply and discharge port, a second supply and discharge port and the swash plate for changing displacement of the fluid pressure pump. The electric motor drives the fluid pressure pump. A first output cylinder passage connects the first output cylinder chamber and the first supply and discharge port. A second output cylinder passage connects the second output cylinder chamber and the second supply and discharge port. A return passage is connected to an accumulator for accumulating working fluid leaked from the fluid pressure pump. A swash plate control cylinder includes a first swash plate control cylinder chamber, a second swash plate control cylinder chamber and a swash plate control piston connected to the swash plate and arranged between the first swash plate control cylinder chamber and the second swash plate control cylinder chamber. The swash plate control cylinder is supplied with working fluid from a swash plate control passage, drives the swash plate and discharges working fluid to the return passage. The shuttle valve supplies working fluid from one passage of the first output cylinder passage and the second output cylinder passage having higher pressure than another passage to the swash plate control passage. When the servo valve has the first state, the servo valve connects the swash plate control passage and the first swash plate control cylinder chamber and connects the return passage and the second swash plate control cylinder chamber. When the servo valve has the second state, the servo valve connects the swash plate control passage and the second swash plate control cylinder chamber and connects the return passage and the first swash plate control cylinder chamber.

According to the present invention, a fluid pressure actuator is provided that permits downsizing and weight-saving of an aircraft steering system and a control method of fluid pressure actuator.

BRIEF DESCRIPTION OF THE DRAWINGS

The above and other objects, advantages and features of the present invention will be more apparent from the following description of certain embodiments taken in conjunction with the accompanying drawings, in which.

DESCRIPTION OF THE PREFERRED EMBODIMENTS

Hereinafter, a fluid pressure actuator according to embodiments of the present invention will be described with reference to the accompanying drawings.

First Embodiment

Figure 1:
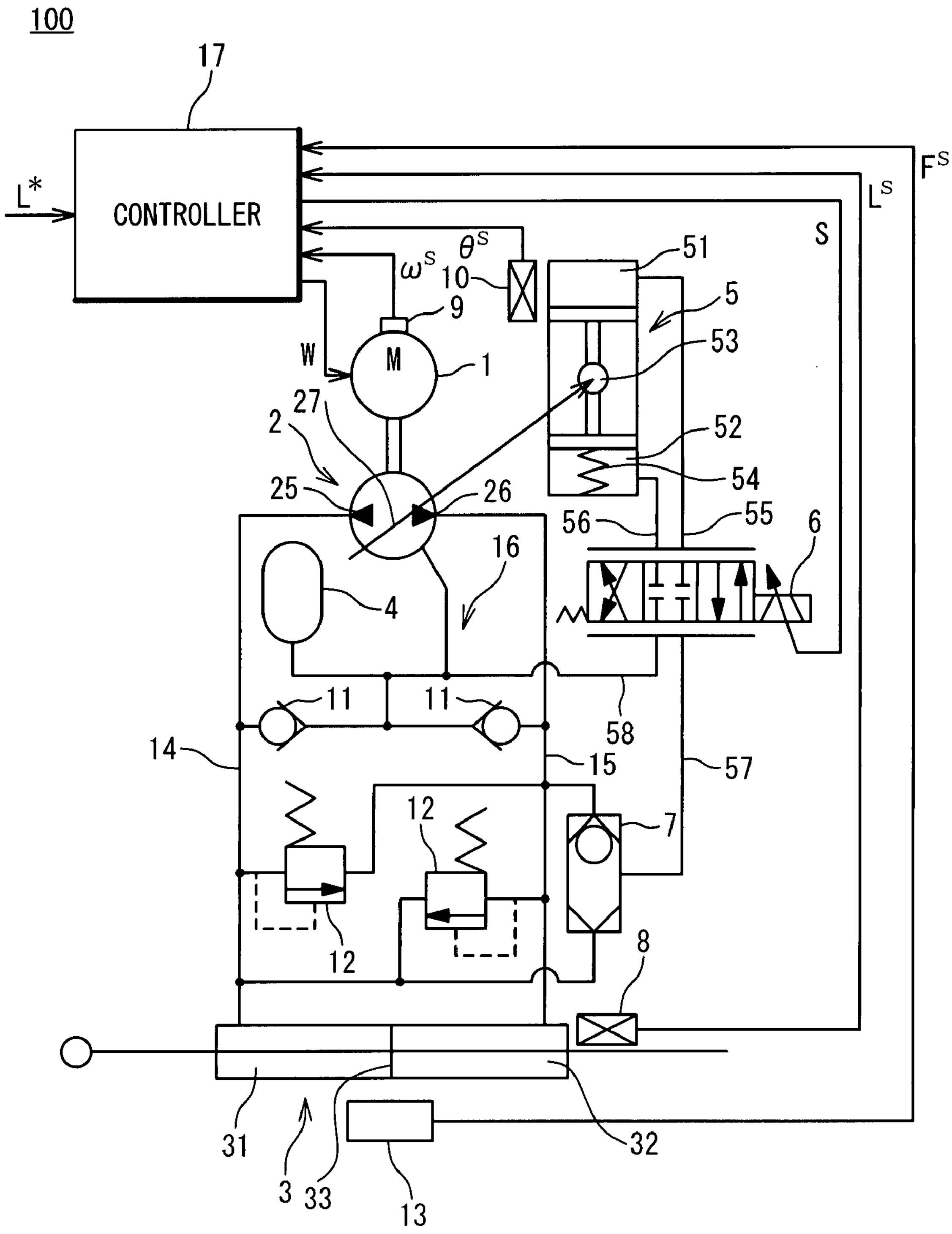
FIG. 1 shows a block diagram of a fluid pressure actuator according to a first embodiment of the present invention.

FIG. 1 shows a block diagram of a fluid pressure actuator 100 according to a first embodiment of the present invention. The fluid pressure actuator 100 may be called as electro hydrostatic actuator. The fluid pressure actuator 100 includes an electric motor 1, a fluid pressure pump 2, an output cylinder 3, a swash plate control cylinder 5, a servo valve 6 such as electric-hydraulic servo valve, a shuttle valve 7, an output piston position sensor 8, a motor speed sensor 9, a swash plate angle sensor 10, two pressure relief valves 12, an output sensor 13, a first output cylinder passage 14, a second output cylinder passage 15, a return passage 16, a controller 17, a first swash plate control passage 55, a second swash plate control passage 56, a third swash plate control passage 57, and a fourth swash plate control passage 58.

The output cylinder 3 includes a first output cylinder chamber 31, a second output cylinder chamber 32, and an output piston 33 arranged between the first output cylinder chamber 31 and the second output cylinder chamber 32. The output piston 33 moves rightward of the figure when working fluid is supplied to the first output cylinder chamber 31 and discharged from the second output cylinder chamber 32. The output piston 33 moves oppositely, i.e., leftward of the figure, when the working fluid is supplied to the second output cylinder chamber 32 and discharged from the first output cylinder chamber 31. The working fluid is, for example, oil.

The fluid pressure pump 2 includes a first supply and discharge port 25, a second supply and discharge port 26, and a swash plate 27 for changing displacement of the fluid pressure pump 2. The electric motor 1 drives the fluid pressure pump 2. The fluid pressure pump 2, upon rotation of the electric motor 1 in a first direction, suctions working fluid through the second supply and discharge port 26 and discharges the suctioned working fluid through the first supply and discharge port 25. The fluid pressure pump 2, upon rotation of the electric motor 1 in a second direction opposite to the first direction, suctions working fluid through the first supply and discharge port 25 and discharges the suctioned working fluid through the second supply and discharge port 26. The swash plate 27 is driven by pressure generated by the fluid pressure pump 2. Since another power source for driving the swash plate 27 is not required, downsizing and weight-saving of the fluid pressure actuator 100 is achieved. Therefore, the fluid pressure actuator 100 is suitable for an aircraft or a space ship.

The first output cylinder passage 14 connects the first supply and discharge port 25 and the first output cylinder chamber 31. The second output cylinder passage 15 connects the second supply and discharge port 26 and the second output cylinder chamber 32. The return passage 16 is connected to an accumulator 4. The accumulator 4 accumulates the working fluid leaked from the fluid pressure pump 2. The working fluid accumulated in the accumulator 4 is returned to the first output cylinder passage 14 via a check valve 11 when pressure in the return passage 16 exceeds pressure in the first output cylinder passage 14. The working fluid accumulated in the accumulator 4 is returned to the second output cylinder passage 15 via another check valve 11 when pressure in the return passage 16 exceeds pressure in the second output cylinder passage 15. One of the two pressure relief valves 12 allows working fluid to escape from the first output cylinder passage 14 to the second output cylinder passage 15 when the pressure in the first output cylinder passage 14 exceeds a cracking pressure. The other of the two pressure relief valves 12 allows working fluid to escape from the second output cylinder passage 15 to the first output cylinder passage 14 when the pressure in the second output cylinder passage 15 exceeds a cracking pressure.

The swash plate control cylinder 5 includes a first cylinder chamber 51, a second cylinder chamber 52, a piston 53 arranged between the first cylinder chamber 51 and the second cylinder chamber 52 and a spring 54. The piston 53 is connected to the swash plate 27. The piston 53 moves downward of the figure when working fluid is supplied to the first cylinder chamber 51 and discharged from the second cylinder chamber 52. The piston 53 moves oppositely, i.e., upward of the figure when working fluid is supplied to the second cylinder chamber 52 and discharged from the first cylinder chamber 51. The spring 54 biases the piston 53 upward of the figure.

The displacement of the fluid pressure pump 2 increases when the piston 53 moves upward of the figure. The displacement of the fluid pressure pump 2 decreases when the piston 53 moves downward of the figure.

The first swash plate control passage 55 connects the first cylinder chamber 51 and the servo valve 6. The second swash plate control passage 56 connects the second cylinder chamber 52 and the servo valve 6. The third swash plate control passage 57 connects the shuttle valve 7 and the servo valve 6. The fourth swash plate control passage 58 connects the return passage 16 and the servo valve 6. The shuttle valve 7 supplies the working fluid from the first output cylinder passage 14 or the second output cylinder passage 15, whichever has higher pressure, to the third swash plate control passage 57.

The controller 17 outputs a servo valve control command S to the servo valve 6 and supplies driving electric power W to the electric motor 1. A piston position command value L* indicating a target position of the output piston 33 is inputted as a signal to the controller 17. The output piston position sensor 8 detects a position of the output piston 33 as a piston position detection value $L^s$ and outputs the piston position detection value $L^s$ as a signal to the controller 17. The motor speed sensor 9 detects the rotation speed of the electric motor 1 as a motor speed detection value $\omega^s$ and outputs the motor speed detection value $\omega^s$ as a signal to the controller 17. The swash plate angle sensor 10, based on the position of the piston 53, outputs a swash plate angle detection value $\theta^s$ as a signal to the controller 17. The output sensor 13 detects an output force of the output piston 33 as an output force detection value $F^s$ based on a pressure difference between the first output cylinder chamber 31 and the second output cylinder chamber 32 and outputs the output force detection value $F^s$ as a signal to the controller 17.

The servo valve 6 has any of first to third states based on the servo valve control command S.

When the servo valve 6 has the first state, the servo valve 6 connects the first swash plate control passage 55 and the third swash plate control passage 57, and connects the second swash plate control passage 56 and the fourth swash plate control passage 58. Higher pressure between pressures in the first output cylinder passage 14 and the second output cylinder passage 15 is denoted as pressure $P_H$. Pressure in the return passage 16 is denoted as pressure $P_{16}$. In case of the first state, biasing force $F_{54}$ by the spring 54 and force based on the pressure difference $P_H$–$P_{16}$ between the pressures $P_H$ and $P_{16}$ act on the piston 53 in the opposite directions. When the servo valve 6 has the first state, if the force based on the pressure difference $P_H$–$P_{16}$ is larger than the biasing force $F_{54}$, the working fluid is supplied from the third swash plate control passage 57 to the first cylinder chamber 51 via the first swash plate control passage 55, and the working fluid in the second cylinder chamber 52 is discharged to the return passage 16 via the second swash plate control passage 56 and the fourth swash plate control passage 58. As a result, the piston 53 moves downward of the figure, which results in smaller displacement of the fluid pressure pump 2. If the force based on the pressure difference $P_H$–$P_{16}$ is smaller than the biasing force $F_{54}$, the movement of the piston 53 downward of the figure is prevented by the spring 54. When the piston 53 is at the downward end position of the figure, the displacement of the fluid pressure pump 2 is at a minimum.

When the servo valve 6 has the second state, the servo valve 6 connects the first swash plate control passage 55 and the fourth swash plate control passage 58, and connects the second swash plate control passage 56 and the third swash plate control passage 57. When the servo valve 6 has the second state, the force based on the pressure difference $P_H$–$P_{16}$ and the biasing force $F_{54}$ act on the piston 53 in the same direction, working fluid is supplied to the second cylinder chamber 52 from the third swash plate control passage 57 via the second swash plate control passage 56, and the working fluid in the output cylinder passage 51 is discharged to the return passage 16 via the first swash plate control passage 55 and the fourth swash plate control passage 58. As a result, the piston 53 moves upward of the figure, which results in larger displacement of the fluid pressure pump 2. When the piston 53 is at the upward end position of the figure, the displacement of the fluid pressure pump 2 is at a maximum.

When the servo valve 6 has the third state, the servo valve 6 closes all the first swash plate control passage 55, the second swash plate control passage 56, the third swash plate control passage 57, and the fourth swash plate control passage 58. As a result, the piston 53 stops at a position such that force acting on the piston 53 downward of the figure by the working fluid in the first cylinder chamber 51 and force acting on the piston 53 upward of the figure by the working fluid in the second cylinder chamber 52 and the spring 54 are in balance.

Figure 2:
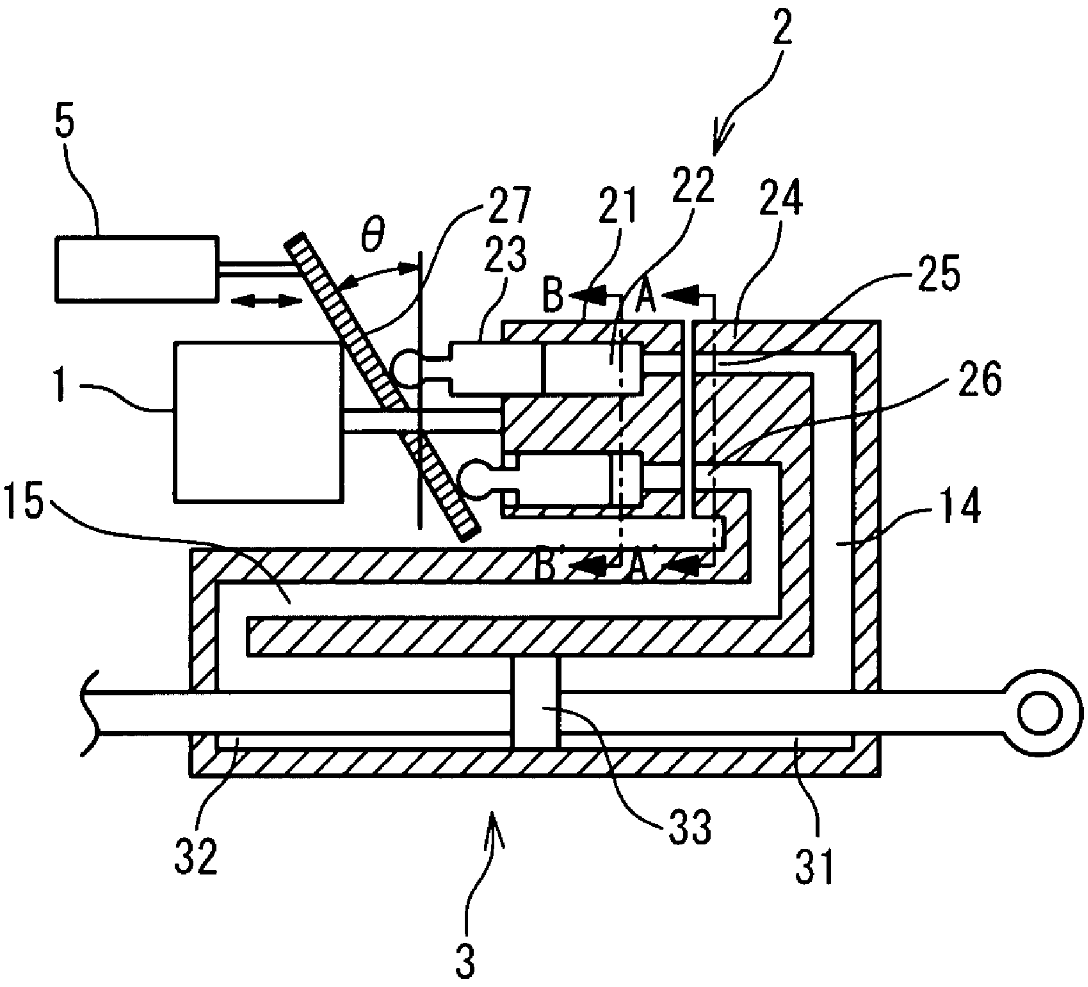
FIG. 2 shows a sectional view of the fluid pressure actuator.
Figure 3:
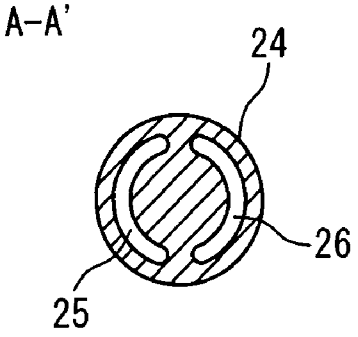
FIG. 3 shows a sectional view along a section line A-A' of FIG. 2.
Figure 4:
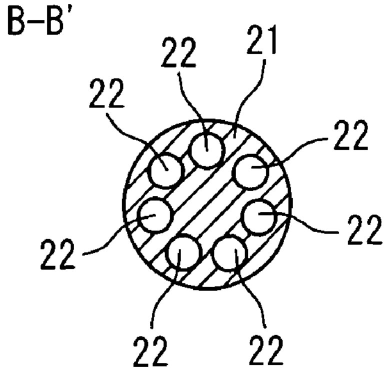
FIG. 4 shows a sectional view along a section line B-B' of FIG. 2.

FIG. 2 shows a sectional view of the fluid pressure actuator 100. The fluid pressure pump 2 includes a cylinder block 21 and a valve plate 24. The cylinder block 21 includes a plurality of cylinder chambers 22 and pump pistons 23 that increase and decrease the volumes of the plurality of cylinder chambers 22. The pump pistons 23 are kept in contact with the swash plate 27. The electric motor 1 rotates the cylinder block 21 around a rotation axis with respect to the valve plate 24. The valve plate 24 includes the first supply and discharge port 25 and the second supply and discharge port 26. The first supply and discharge port 25 and the second supply and discharge port 26 are formed to be rotationally-symmetric through 180 degrees with respect to the rotation axis, as shown in FIG. 3. The plurality of cylinder chambers 22, as shown in FIG. 4, are arranged at equal angular intervals on a circle having the rotation axis as a center. There is a gap between the cylinder block 21 and the valve plate 24. The cylinder chambers 22 face the first supply and discharge port 25 and the second supply and discharge port 26 in parallel to the rotation axis with the gap arranged therebetween. When the electric motor 1 rotates the cylinder block 21, the pump piston 23, due to the tilt of the swash plate 27 with respect to the rotation axis, moves forward and backward along a direction parallel to the rotation axis. One cycle of the forward and backward movement of the pump piston 23 corresponds to one rotation of the cylinder block 21. The forward and backward movement of the pump piston 23 increases and decreases the volume of the cylinder chamber 22. The first supply and discharge port 25 is arranged to face the cylinder chamber 22 whose volume is decreasing when the electric motor 1 is rotating in the first direction. The second supply and discharge port 26 is arranged to face the cylinder chamber 22 whose volume is increasing when the electric motor 1 is rotating in the first direction. In this case, when the electric motor 1 rotates in the second direction, the first supply and discharge port 25 faces the cylinder chamber 22 whose volume is increasing and the second supply and discharge port 26 faces the cylinder chamber 22 whose volume is decreasing. A swash plate angle θ in the figure denotes the angle of the swash plate 27. The swash plate angle θ is zero degrees when the swash plate 27 is perpendicular to the rotation axis of the cylinder block 21. When the swash plate angle θ is large, the displacement of the fluid pressure pump 2 is large. When the swash plate angle θ is small, the displacement of the fluid pressure pump 2 is small. The piston 53 of the swash plate control cylinder 5 is connected to the swash plate 27. The swash plate control cylinder 5 changes the swash plate angle θ. The swash plate angle sensor 10, based on the position of the piston 53, detects the swash plate angle θ as the swash plate angle detection value $\theta^s$, and outputs the swash plate angle detection value $\theta^s$.

Figure 5:
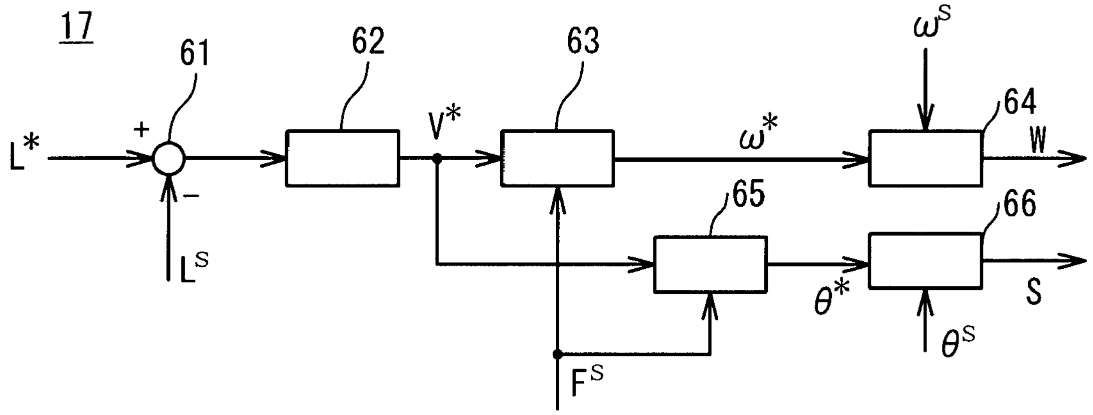
FIG. 5 shows a block diagram of a controller of the fluid pressure actuator.

FIG. 5 shows a block diagram of the controller 17. The controller 17 includes a subtracter 61, a piston speed command value generation section 62, a motor speed command value generation section 63, a motor speed control section 64, a swash plate angle command value generation section 65, and a swash plate angle control section 66. The subtracter 61 obtains a difference $L^*-L^s$ between the piston position command value L* and the piston position detection value $L^s$ by subtraction, and outputs the difference $L^*-L^s$ as a signal to the piston speed command value generation section 62. The piston speed command value generation section 62, based on a predetermined control rule, obtains a piston speed command value V* which indicates a target speed of the output piston 33 and is based on the difference $L^*-L^s$, and outputs the piston speed command value V* as signals to the motor speed command value generation section 63 and the swash plate angle command value generation section 65. The motor speed command value generation section 63, based on the piston speed command value V* and the output force detection value $F^s$, obtains a motor speed command value ω* indicating a target rotation speed of the electric motor 1, and outputs the motor speed command value ω* as a signal to the motor speed control section 64. The motor speed control section 64 supplies the driving electric power W to the electric motor 1 such that the motor speed detection value $\omega^s$ agrees with the motor speed command value ω*. The motor speed control section 64 controls the rotation speed of the electric motor 1 based on the motor speed command value ω* and the motor speed detection value $\omega^s$. The swash plate angle command value generation section 65, based on the piston speed command value V* and the output force detection value $F^s$, obtains a swash plate angle command value θ* indicating a target angle of the swash plate angle θ, and outputs the swash plate angle command value θ* as a signal to the swash plate angle control section 66. The swash plate angle control section 66 outputs the servo valve control command S to the servo valve 6 such that the swash plate angle detection value $\theta^s$ agrees with the swash plate angle command value θ*. The swash plate angle control section 66 controls the servo valve 6 to have one of the first to third state based on the swash plate angle detection value $\theta^s$ and the swash plate angle command value θ*.

Figure 6:
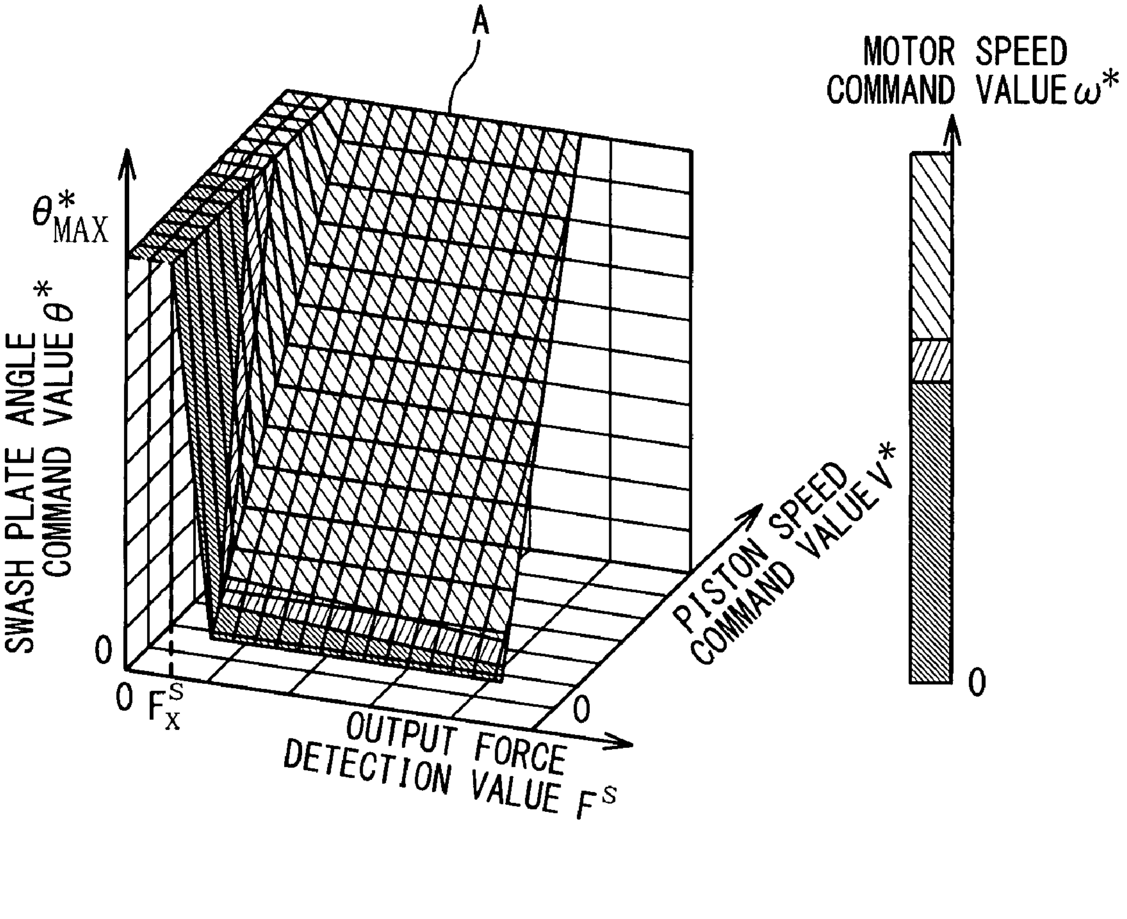
FIG. 6 is a graph showing a control rule according to the first embodiment.

FIG. 6 is a graph showing one example of a rule based on which the motor speed command value generation section 63 and the swash plate angle command value generation section 65 obtain the motor speed command value ω* and the swash plate angle command value θ* from the piston speed command value V* and the output force detection value $F^s$. In FIG. 6, a surface A is shown. The surface A associates a set of the piston speed command value V* and the output force detection value $F^s$ with a set of the motor speed command value ω* and the swash plate angle command value θ*. The surface A defines the following equation:

$$\theta^*=F(F^s,V^*).$$

The swash plate angle command value θ* is a function of the piston speed command value V* and the output force detection value $F^s$. The surface A is composed of a plurality of areas corresponding to different values of the motor speed command value ω*. The different values of the motor speed command value ω* are indicated by different hutching in the figure. That is, the surface A defines the following equation:

$$\omega^*=G(F^s,V^*).$$

The motor speed command value ω* is a function of the piston speed command value V* and the output force detection value $F^s$.

When the fluid pressure actuator 100 is required to achieve fast working speed and low power consumption, it is preferable that the following relationships basically hold:

$$F(F^s_1,V^*)>F(F^s_2,V^*),$$

$$F(F^s,V^*_1)<F(F^s,V_2),$$

$$G(F^s_1,V^*)<G(F^s_2,V^*),\text{ and}$$

$$G(F^s,V^*_1)<G(F^s,V^*_2).$$

Here, for $F^s_1$ and $F^s_2$ as $F^s$ and for $V^*_1$ and $V^*_2$ as V*, $$F^s_1<F^s_2,\text{ and}$$

$$V^*_1<V^*_2.$$

However, for $0<F^s_1<F^s_2<F^s_X$, it is preferable:

$$F(F^s_1,V^*)=F(F^s_2,V^*)=\theta^*_{MAX},$$

where $F^s_X$ is a predetermined value and $\theta^*_{MAX}$ is a maximum value of the swash plate angle command value θ*.

Accordingly, the swash plate angle command value θ* indicates the maximum value $\theta^*_{MAX}$ as constant when the output force detection value $F^s$ is smaller than the predetermined value $F^s_X$. The swash plate angle command value θ* indicates an angle which is smaller than the maximum value $\theta^*_{MAX}$ and is smaller as the output force detection value $F^s$ is larger when the output force detection value $F^s$ is larger than the predetermined value $F^s_X$. The displacement of the fluid pressure pump 2 is larger as the swash plate angle θ is larger.

If the output force of the output piston 33 is small, a pressure required for controlling the swash plate 27 cannot be secured, and thus the swash plate angle command value θ* is set at the maximum value. Fast working speed of fluid pressure actuator 100 can also be provided when the output force of the output piston 33 is small. The symbol $\theta^*_{MAX}$ corresponds to a maximum value of the swash plate angle θ.

The subtracter 61, the piston speed command value generation section 62, the motor speed command value generation section 63, the motor speed control section 64, the swash plate angle command value generation section 65, and the swash plate angle control section 66 are, for example electric circuits. The functions of the subtracter 61, the piston speed command value generation section 62, the motor speed command value generation section 63, and the swash plate angle command value generation section 65 can be exemplified by a computer which operates based on a program. The program is stored in a storage medium.

In the present embodiment, the displacement of the fluid pressure pump 2 is adjustable. A decrease in the displacement makes it possible to hold the output piston 33 at a certain position against external force acting on the output piston 33 with low power consumption. An increase in the displacement makes it possible to move the output piston 33 at high speed.

In the present embodiment, the swash plate 27 of the fluid pressure pump 2 is driven by the pressure generated by the fluid pressure pump 2. Another power source for driving the swash plate 27 is not required, and thus the downsizing and weight-saving of the fluid pressure actuator 100 is achieved. Therefore, the fluid pressure actuator 100 is suitable for an aircraft or a space ship.

In the present embodiment, even when the states cannot be changed due to accident to the servo valve 6, the spring 54 holds the displacement of the fluid pressure pump 2 at a large value. This permits avoiding deterioration in the response of the output piston 33 during the accident to the servo valve 6. Therefore, the fluid pressure actuator 100 is suitable for steering an aircraft.

Second Embodiment

Figure 7:
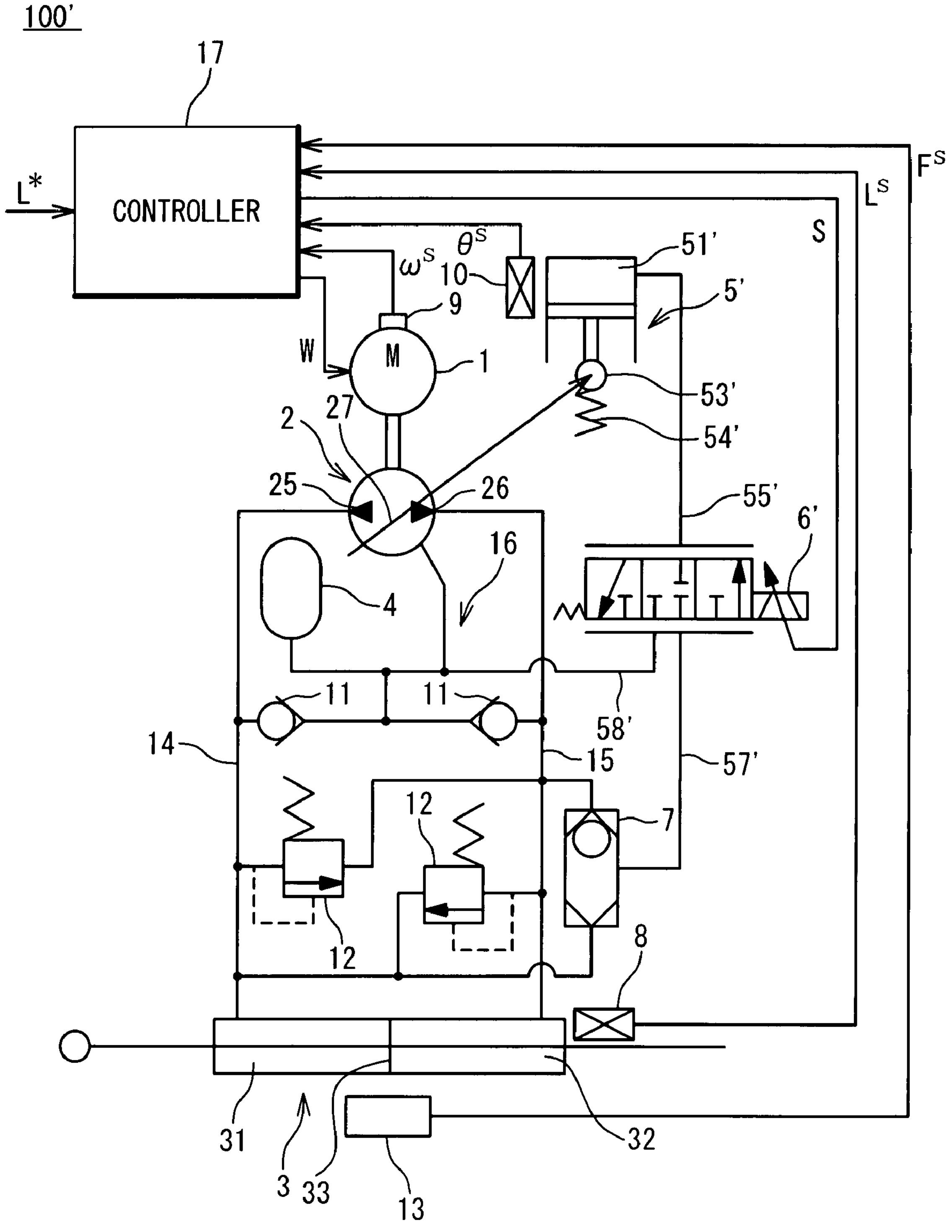
FIG. 7 shows a block diagram of a fluid pressure actuator according to a second embodiment of the present invention.

FIG. 7 shows a block diagram of a fluid pressure actuator 100' according to a second embodiment of the present invention. The fluid pressure actuator 100' may be called as electro hydrostatic actuator. The fluid pressure actuator 100' corresponds to the fluid pressure actuator 100 according to the first embodiment in which the swash plate control cylinder 5, the servo valve 6, the first swash plate control passage 55, the third swash plate control passage 57 and the fourth swash plate control passage 58 are replaced with a swash plate control cylinder 5', a servo valve 6', a first swash plate control passage 55', a third swash plate control passage 57' and a fourth swash plate control passage 58', respectively, and the second swash plate control passage 56 is eliminated. The swash plate control cylinder 5' includes a first cylinder chamber 51', a piston 53' arranged in the first cylinder chamber 51', and a spring 54'. The piston 53' is connected to the swash plate 27. The first swash plate control passage 55', connects the first cylinder chamber 51' and the servo valve 6'. The third swash plate control passage 57' connects the shuttle valve 7 and the servo valve 6'. The fourth swash plate control passage 58' connects the return passage 16 and the servo valve 6'. The swash plate angle sensor 10 detects the swash plate angle detection value $\theta^s$ based on the position of the piston 53'.

The piston 53' moves downward of the figure and thus contracts the spring 54' when the working fluid is supplied to the first cylinder chamber 51'. When working fluid is discharged from the first cylinder chamber 51', the spring 54' elongates and thereby moves the piston 53' upward of the figure.

The servo valve 6' has any of first to third states based on the servo valve control command S.

When the servo valve 6' has the first state, the servo valve 6' connects the first swash plate control passage 55' and the third swash plate control passage 57' and closes the fourth swash plate control passage 58'. When the servo valve 6' has the first state, if force acting on the piston 53' based on the pressure $P_H$ above described is larger than biasing force $F_{54'}$ by which the spring 54' biases the piston 53' upward of the figure, working fluid is supplied from the third swash plate control passage 57' to the first cylinder chamber 51' via the first swash plate control passage 55'. As a result, the piston 53' moves downward of the figure, which results in smaller displacement of the fluid pressure pump 2.

When the servo valve 6' has the second state, the servo valve 6' connects the first swash plate control passage 55' and the fourth swash plate control passage 58' and closes the third swash plate control passage 57'. When the servo valve 6' has the second state, the spring 54' moves the piston 53' upward of the figure by the biasing force. As a result, the working fluid in the first cylinder chamber 51' is discharged to the return passage 16 via the first swash plate control passage 55' and the fourth swash plate control passage 58'.

When the servo valve 6' has the third state, the servo valve 6' closes all the first swash plate control passage 55', the third swash plate control passage 57', and the fourth swash plate control passage 58'. As a result, the piston 53' stops at a position such that force acting on the piston 53' downward of the figure by the working fluid in the first cylinder chamber 51' and force acting on the piston 53' upward of the figure by the spring 54' are in balance.

In the present embodiment, the swash plate 27 of the fluid pressure pump 2 is driven by the pressure generated by the fluid pressure pump 2. Another power source for driving the swash plate 27 is not required, and thus downsizing and weight-saving of the fluid pressure actuator 100' are achieved. Therefore, the fluid pressure actuator 100' is suitable for an aircraft or a space ship.

In the present embodiment, even when the states cannot be changed due to accident to the servo valve 6', the spring 54' holds the displacement of the fluid pressure pump 2 at a large value. This permits avoiding deterioration in the response of the output piston 33 during the accident to the servo valve 6'. Therefore, the fluid pressure actuator 100' is suitable for steering an aircraft.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A fluid pressure actuator comprising:

an output cylinder including a first output cylinder chamber, a second output cylinder chamber and an output piston arranged between said first output cylinder chamber and said second output cylinder chamber;

a fluid pressure pump including a first supply and discharge port, a second supply and discharge port and a swash plate for changing displacement of said fluid pressure pump;

an electric motor configured to drive said fluid pressure pump;

a first output cylinder passage connecting said first output cylinder chamber and said first supply and discharge port;

a second output cylinder passage connecting said second output cylinder chamber and said second supply and discharge port;

a return passage connected to an accumulator for accumulating working fluid leaked from said fluid pressure pump;

a swash plate control cylinder configured to be supplied with working fluid from one passage of said first output cylinder passage and said second output cylinder passage having higher pressure than another passage, to drive said swash plate and to discharge working fluid to said return passage;

a swash plate control passage;

a shuttle valve configured to supply working fluid from said one passage to said swash plate control passage; and a servo valve configured to have a first state and a second state, wherein said swash plate control cylinder includes a first swash plate control cylinder chamber, a second swash plate control cylinder chamber and a swash plate control piston arranged between said first swash plate control cylinder chamber and said second swash plate control cylinder chamber, said swash plate control piston is connected to said swash plate, when said servo valve has said first state, said servo valve connects said swash plate control passage and said first swash plate control cylinder chamber and connects said return passage and said second swash plate control cylinder chamber, and when said servo valve has said second state, said servo valve connects said swash plate control passage and said second swash plate control cylinder chamber and connects said return passage and said first swash plate control cylinder chamber.

2. The fluid pressure actuator according to claim 1, wherein said swash plate control cylinder includes a spring which biases said swash plate control piston in a direction of increasing said displacement of said fluid pressure pump.

3. The fluid pressure actuator according to claim 2, further comprising:

a controller;

a piston position sensor configured to detect a position of said output piston as a piston position detection value;

a motor speed sensor configured to detect a rotation speed of said electric motor as a motor speed detection value;

a swash plate angle sensor configured to detect a swash plate angle of said swash plate as a swash plate angle detection value; and an output sensor configured to detect an output force of said output cylinder as an output force detection value, wherein said controller is configured to:

obtain a piston speed command value which indicates a target speed of said output piston and is based on a difference between said output piston position detection value and an output piston position command value indicating a target position of said output piston;

obtain a motor speed command value indicating a target rotation speed of said electric motor based on said piston speed command value and said output force detection value;

obtain a swash plate angle command value indicating a target swash plate angle of said swash plate based on said piston speed command value and said output force detection value;

control said rotation speed of said electric motor based on said motor speed detection value and said motor speed command value; and control said servo valve to have said first state or said second state based on said swash plate angle detection value and said swash plate angle command value.

4. The fluid pressure actuator according to claim 3, wherein said swash plate angle command value indicates a constant angle when said output force detection value is smaller than a predetermined value, said swash plate angle command value indicates an angle which is smaller than said constant angle and is smaller as said output force detection value is larger when said output force detection value is larger than said predetermined value, and said displacement of said fluid pressure pump is larger as said swash plate angle is larger.

5. The fluid pressure actuator according to claim 1, further comprising:

a controller;

a piston position sensor configured to detect a position of said output piston as a piston position detection value;

a motor speed sensor configured to detect a rotation speed of said electric motor as a motor speed detection value;

a swash plate angle sensor configured to detect a swash plate angle of said swash plate as a swash plate angle detection value; and an output sensor configured to detect an output force of said output cylinder as an output force detection value, wherein said controller is configured to:

obtain a piston speed command value which indicates a target speed of said output piston and is based on a difference between said output piston position detection value and an output piston position command value indicating a target position of said output piston;

obtain a motor speed command value indicating a target rotation speed of said electric motor based on said piston speed command value and said output force detection value;

obtain a swash plate angle command value indicating a target swash plate angle of said swash plate based on said piston speed command value and said output force detection value;

control said rotation speed of said electric motor based on said motor speed detection value and said motor speed command value; and control said servo valve to have said first state or said second state based on said swash plate angle detection value and said swash plate angle command value.

6. The fluid pressure actuator according to claim 5, wherein said swash plate angle command value indicates a constant angle when said output force detection value is smaller than a predetermined value, said swash plate angle command value indicates an angle which is smaller than said constant angle and is smaller as said output force detection value is larger when said output force detection value is larger than said predetermined value, and said displacement of said fluid pressure pump is larger as said swash plate angle is larger.

7. A fluid pressure actuator comprising:

an output cylinder including a first output cylinder chamber, a second output cylinder chamber and an output piston arranged between said first output cylinder chamber and said second output cylinder chamber;

a fluid pressure pump including a first supply and discharge port, a second supply and discharge port and a swash plate for changing displacement of said fluid pressure pump;

an electric motor configured to drive said fluid pressure pump;

a first output cylinder passage connecting said first output cylinder chamber and said first supply and discharge port;

a second output cylinder passage connecting said second output cylinder chamber and said second supply and discharge port;

a return passage connected to an accumulator for accumulating working fluid leaked from said fluid pressure pump;

a swash plate control cylinder which includes a first swash plate control cylinder chamber, a second swash plate control cylinder chamber and a swash plate control piston connected to said swash plate and arranged between said first swash plate control cylinder chamber and said second swash plate control cylinder chamber and is configured to be supplied with working fluid from a swash plate control passage, to drive said swash plate and to discharge working fluid to said return passage;

a shuttle valve configured to supply working fluid from one passage of said first output cylinder passage and said second output cylinder passage having higher pressure than another passage to said swash plate control passage;

a servo valve;

a piston position sensor configured to detect a position of said output piston as a piston position detection value;

a motor speed sensor configured to detect a rotation speed of said electric motor as a motor speed detection value;

a swash plate angle sensor configured to detect a swash plate angle of said swash plate as a swash plate angle detection value;

an output sensor configured to detect an output force of said output cylinder as an output force detection value;

a means for obtaining a piston speed command value which indicates a target speed of said output piston and is based on a difference between said output piston position detection value and an output piston position command value indicating a target position of said output piston;

a means for obtaining a motor speed command value indicating a target rotation speed of said electric motor based on said piston speed command value and said output force detection value;

a means for obtaining a swash plate angle command value indicating a target swash plate angle of said swash plate based on said piston speed command value and said output force detection value;

a means for controlling said rotation speed of said electric motor based on said motor speed detection value and said motor speed command value; and a means for controlling said servo valve to have a first state or a second state based on said swash plate angle detection value and said swash plate angle command value, wherein when said servo valve has said first state, said servo valve connects said swash plate control passage and said first swash plate control cylinder chamber and connects said return passage and said second swash plate control cylinder chamber, and when said servo valve has said second state, said servo valve connects said swash plate control passage and said second swash plate control cylinder chamber and connects said return passage and said first swash plate control cylinder chamber.

8. The fluid pressure actuator according to claim 7, wherein said swash plate angle command value indicates a constant angle when said output force detection value is smaller than a predetermined value, said swash plate angle command value indicates an angle which is smaller than said constant angle and is smaller as said output force detection value is larger when said output force detection value is larger than said predetermined value, and said displacement of said fluid pressure pump is larger as said swash plate angle is larger.

9. A control method of a fluid pressure actuator, the control method comprising:

detecting a position of an output piston of an output cylinder as a piston position detection value;

detecting a rotation speed of an electric motor as a motor speed detection value;

detecting a swash plate angle of a swash plate as a swash plate angle detection value;

detecting an output force of said output cylinder as an output force detection value;

obtaining a piston speed command value which indicates a target speed of said output piston and is based on a difference between said output piston position detection value and an output piston position command value indicating a target position of said output piston;

obtaining a motor speed command value indicating a target rotation speed of said electric motor based on said piston speed command value and said output force detection value;

obtaining a swash plate angle command value indicating a target swash plate angle of said swash plate based on said piston speed command value and said output force detection value;

controlling said rotation speed of said electric motor based on said motor speed detection value and said motor speed command value; and controlling a servo valve to have a first state or a second state based on said swash plate angle detection value and said swash plate angle command value, wherein said output cylinder includes a first output cylinder chamber, a second output cylinder chamber and said output piston arranged between said first output cylinder chamber and said second output cylinder chamber, a fluid pressure pump includes a first supply and discharge port, a second supply and discharge port and said swash plate for changing displacement of said fluid pressure pump, said electric motor is configured to drive said fluid pressure pump, a first output cylinder passage connects said first output cylinder chamber and said first supply and discharge port, a second output cylinder passage connects said second output cylinder chamber and said second supply and discharge port, a return passage is connected to an accumulator for accumulating working fluid leaked from said fluid pressure pump, a swash plate control cylinder includes a first swash plate control cylinder chamber, a second swash plate control cylinder chamber and a swash plate control piston connected to said swash plate and arranged between said first swash plate control cylinder chamber and said second swash plate control cylinder chamber, said swash plate control cylinder is configured to be supplied with working fluid from a swash plate control passage, to drive said swash plate and to discharge working fluid to said return passage, a shuttle valve is configured to supply working fluid from one passage of said first output cylinder passage and said second output cylinder passage having higher pressure than another passage to said swash plate control passage, when said servo valve has said first state, said servo valve connects said swash plate control passage and said first swash plate control cylinder chamber and connects said return passage and said second swash plate control cylinder chamber, and when said servo valve has said second state, said servo valve connects said swash plate control passage and said second swash plate control cylinder chamber and connects said return passage and said first swash plate control cylinder chamber.

10. The control method of a fluid pressure actuator according to claim 9, wherein said swash plate angle command value indicates a constant angle when said output force detection value is smaller than a predetermined value, said swash plate angle command value indicates an angle which is smaller than said constant angle and is smaller as said output force detection value is larger when said output force detection value is larger than said predetermined value, and said displacement of said fluid pressure pump is larger as said swash plate angle is larger.

* * * * *